US006791782B1

United States Patent
Codilian et al.

(10) Patent No.: US 6,791,782 B1
(45) Date of Patent: Sep. 14, 2004

(54) METHOD AND APPARATUS FOR DETERMINING OPERATIONAL SPINDLE ROTATION RATE IN A DISK DRIVE

(75) Inventors: Raffi Codilian, Irvine, CA (US); William D. Johns, Dana Point, CA (US); Joseph M. Viglione, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 448 days.

(21) Appl. No.: 10/066,223

(22) Filed: Jan. 31, 2002

(51) Int. Cl.[7] ............................................. G11B 15/46
(52) U.S. Cl. ................................................... 360/73.03
(58) Field of Search ......................... 360/73.03, 73.01, 360/69

(56) References Cited

U.S. PATENT DOCUMENTS 6,741,414 B1 * 5/2004 Boyd et al. ............... 360/73.03

* cited by examiner

*Primary Examiner*—David Hudspeth
*Assistant Examiner*—Mitchell Slavitt
(74) *Attorney, Agent, or Firm*—Milad G. Shara, Esq.; Knobbe Martens Olson & Bear (57) ABSTRACT

A method and an apparatus select the operational spindle rotation rate for a disk drive based on measured performance of the head-disk assembly. The position error values are measured and analyzed to generate a position error metric. Based on the value of the position error metric, an operational spindle rotation rate is selected for use when the head-disk assembly is combined with a controller to produce a disk drive.

15 Claims, 6 Drawing Sheets

METHOD AND APPARATUS FOR DETERMINING OPERATIONAL SPINDLE ROTATION RATE IN A DISK DRIVE

BACKGROUND OF THE INVENTION

1. Field of the Invention

The present invention relates to a method for optimizing the performance of a disk drive. More specifically, it involves the determination of the operational spindle rotation rate based on measured servo performance.

2. Description of the Related Art

Disk drives are principal components in the vast majority of computer systems. The drives store information in a non-volatile manner and can be readily written, read, and re-written. Large amounts of information can be stored on disk drives reliably at low cost.

A typical disk drive consists of one or more rigid disks or "platters" that are attached to a spindle. The spindle is attached to a spindle motor that rotates the spindle and the attached platter or platters. The surfaces of the platters comprise a magnetic medium. As the platters rotate, magnetic heads write magnetic transitions to or read magnetic transitions on the medium.

The magnetic storage portion of the disk platters is organized into substantially concentric circular regions. Each circular region is divided into arcuate sectors formed by regular angular wedge-like demarcations around the disk. The magnetic read and write heads are attached to an actuator that moves the head to read or write a particular sector of the platter or platters.

An important metric for the performance of a disk is the amount of time that it takes for the drive to access a particular piece of data on the disk. The disk access time, in turn, is directly affected by the spindle rotation rate of the disk. In general, a higher rotation rate increases data transfer rate performance due to the reduction of spindle latency. However, a higher rotation rate may also result in degraded track follow performance which may adversely affect data transfer performance. In particular, the physical properties of the disk platters, the heads, the spindle, the associated bearings, the motor, and other components of the disk drive limit the ability to operate head disk assemblies in hard drives at extremely high rotation rates. Manufacturing and quality control costs associated with maintaining the tolerances needed to enable operation of an assembled disk drive at a higher spindle rotation rate result in the substantially increased cost of higher rotation rate drives. For example, in conventional disk drive manufacturing, a portion of disk drives are rejected because they can not meet the target operational spindle rate.

SUMMARY OF THE INVENTION

A first aspect of the present invention is a method for determining the operational rotation rate for a head-disk assembly that may be incorporated into a fully assembled disk drive. The head-disk assembly comprises a recording head, a rotary actuator, a spindle motor, and a storage medium. The storage medium is coupled to the spindle motor and has an inner circumference and an outer circumference with a magnetic storage portion between the inner and outer circumference. Servo tracks are written to the storage medium to provide positioning information for the read and write heads. A set of position error values are measured while operating the head-disk assembly at a first spindle rotation rate. These position error values are measured by repeatedly reading the servo tracks and comparing the observed position of the servo track to the expected position. The set of position error values are analyzed to generate a position error metric value. An operational spindle rotation rate is selected based on the position error metric value.

Another aspect of the present invention is a disk drive having a rotary actuator, a recording head mounted on the rotary actuator, and a storage medium. The storage medium has a magnetic-storage portion located between the inner circumference and the outer circumference of the storage medium. The disk drive also has a spindle motor that rotates the storage medium. A recorded operational rotation rate based on position error values is measured during testing. The disk drive additionally has a spindle motor rate controller configured to operate the spindle motor at the recorded operational rotation rate.

Another aspect of the present invention is a servo track writer that writes calibration tracks on the storage medium of a head-disk assembly and that determines the operational disk spindle rotation rate. The head-disk assembly has a head for reading and writing to the disk. The head-disk assembly also has an actuator. The servo track writer has a controller, a servo performance measurement circuit, and a spindle rotation rate circuit. The controller processes a clock reference pattern to determine the location of the write element and directs the head to write the servo tracks on the storage medium. The servo performance measurement circuit measures position error values of the servo tracks written on the head-disk assembly and generates a position error metric value. The spindle rotation rate circuit selects an operational rotation rate based on the position error metric value.

BRIEF DESCRIPTION OF THE DRAWINGS

The accompanying drawings are included to provide a further understanding of the present invention and are incorporated in and constitute a part of this specification. The drawings illustrate embodiments of the present invention and, together with the description, serve to explain the principles of the invention.

DETAILED DESCRIPTION OF THE PREFERRED EMBODIMENT

Figure 1:
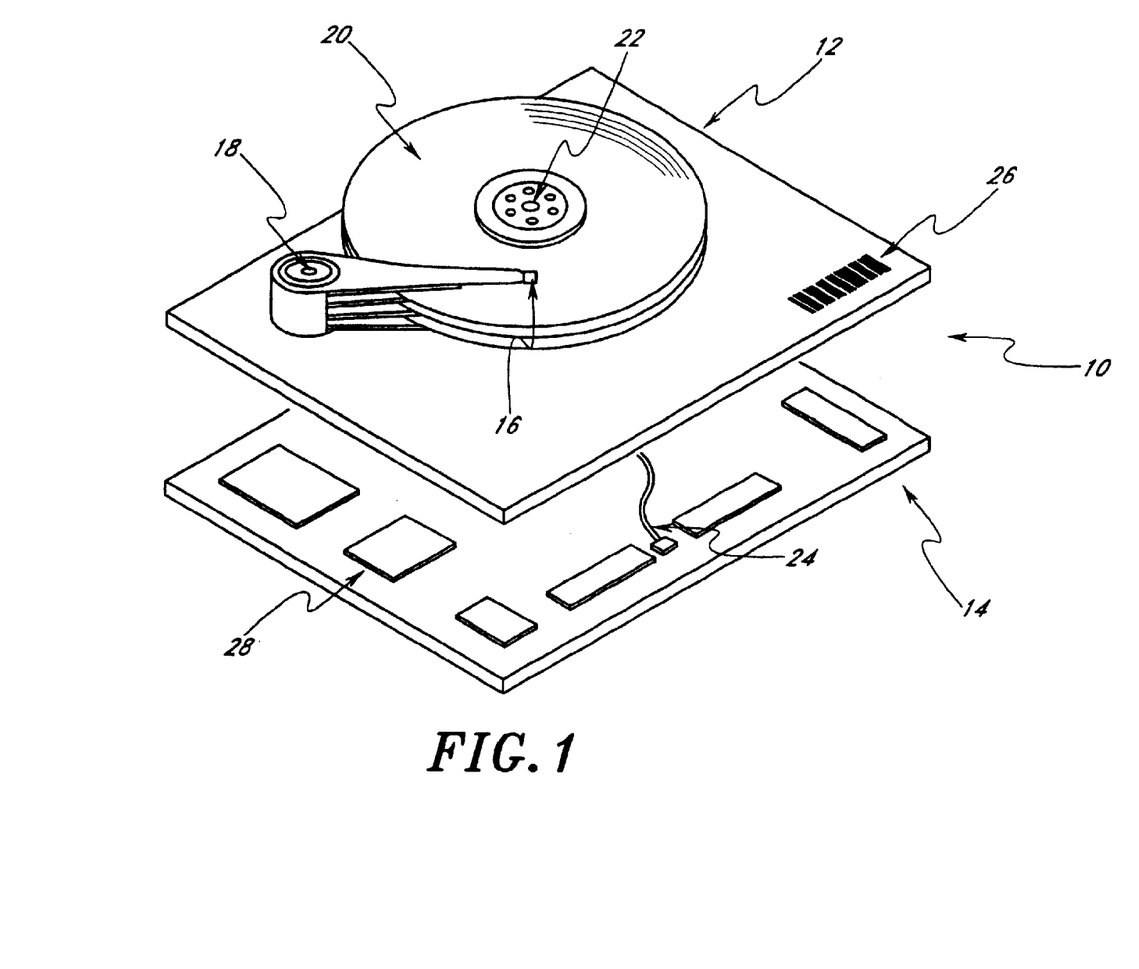
FIG. 1 schematically illustrates a hard disk drive incorporating the present invention.

FIG. 1 shows a disk drive 10, which comprises a head-disk assembly 12 and a controller board 14. The head-disk assembly 12 has a read/write head 16 mounted to a rotary actuator 18 that can position the head 16 relative to one or more disks 20. The head 16 advantageously comprises a write element and a read element (not shown.) The disks 20 are centrally mounted to a spindle 22 driven by a spindle motor 403 (not shown in FIG. 1) mounted below the disks 20. The disk 20 is coated with a magnetic storage medium 410. Magnetic transitions are recorded onto this medium 410 by the write element of the read/write head 16 and are read from it by the read element of the read/write head 16.

The head-disk assembly 12 also advantageously includes a unique identifier 26. In the embodiment shown, the unique identifier 26 is a bar code. The unique identifier 26 can also be a serial number or other indicia visibly marked on the head-disk assembly 12. The unique identifier 26 can also be an electronic identifier recorded magnetically on the disk 20. In some embodiments of the disk drive 10, the unique identifier 26 can be a intrinsically occurring property of the head-disk assembly 12, e.g., a jumper wire, which can serve to distinguish it from other head disk assemblies 12.

The controller board 14 is electrically connected to the head-disk assembly 12 via a cable 24 or other form of electrical connection, such as, for example, a printed circuit board, a solder connection, or a standard plug connector. The controller typically contains one or more integrated circuits 28 containing the operational control parameters needed to operate the head-disk assembly 12 when it is incorporated into a disk drive 10.

Figure 3:
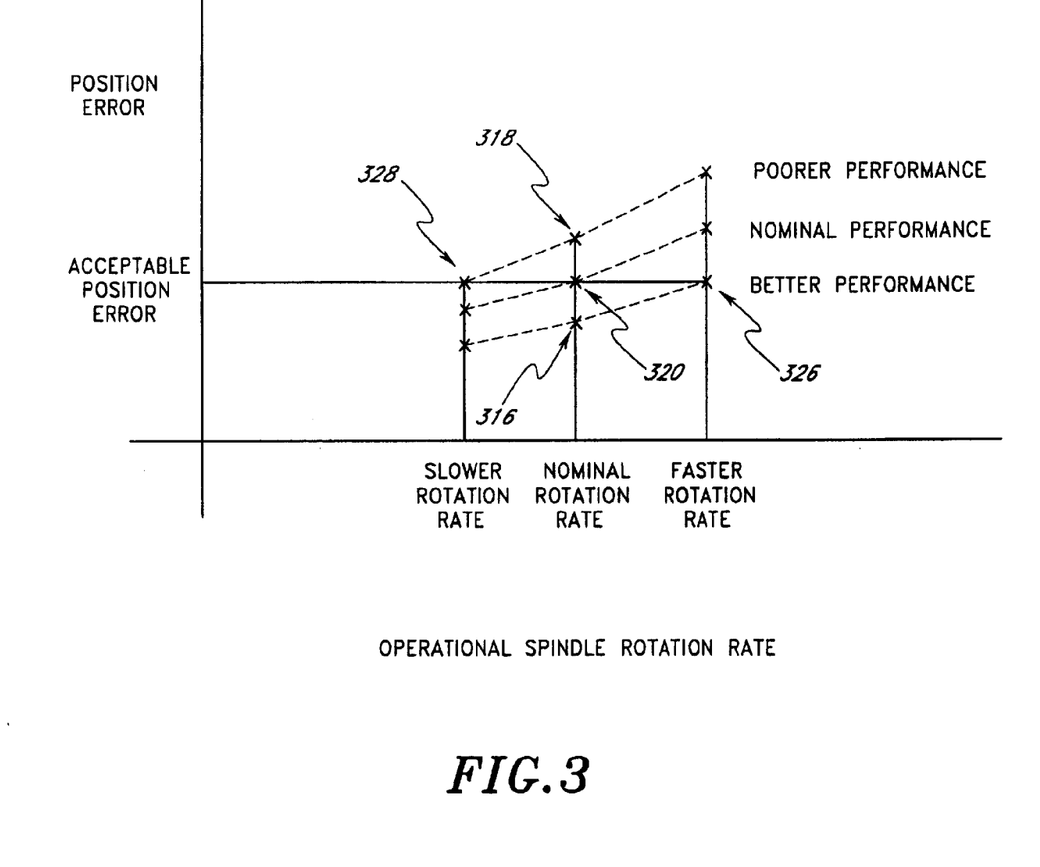
FIG. 3 schematically illustrates the relationship between position variance and spindle rotation rate for various populations of head-disk assemblies.

Dynamic variations in the motion of the spindle 22, the behavior of the spindle motor 403, the behavior of the rotary actuator 18, and the movement of the disks 20 result in errors in the position of the recording head 16 relative to the disks 20. A number of these effects are affected by the rotation rate of the spindle 22 of the head-disk assembly 12. FIG. 3 generally illustrates the relationship of the position error of the heads 16 as a function of the operational spindle rotation rate. As the operational spindle rotation rate increases, the general trend is for the position error to also increase. This relationship is, however, not monotonic. Resonance and other phenomena can cause the position error to deviate from this general trend as the spindle rotation rate is changed.

Since position error is directly affected by the physical characteristics of the head-disk assembly 12, not all disk drives 10 behave in the same manner. A disk drive 10 when operated at the target rotation rate, can demonstrate a better track follow performance (as indicated by a position error 316) or a worse track follow performance (as indicated by a position error 318) as compared to an expected track follow performance (as indicated by a position error 320). A disk drive demonstrating a markedly better track follow performance at the target rotation rate is far more likely to provide acceptable track follow performance at a higher spindle rotation rate. A disk drive 10 that operates acceptably at a higher spindle rotation rate has improved data transfer rate performance characteristics and can be sold at a premium.

Similarly, a head-disk assembly 12 which has a markedly worse track follow performance (e.g., position 318) when operated at the target spindle rotation rate can demonstrate an acceptable track follow performance (e.g., a position error 328) when operated at a lower spindle rotation rate. Operating the drive at a slower rotation rate permits poorer performing drives to be utilized rather than being discarded as manufacturing losses.

A number of options may be used during the manufacturing of the disk drive 10 for the selection of the initial rotation rate for evaluating the performance of the head-disk assembly. The performance of the head-disk assembly at a lower spindle rotation rate may be evaluated and, if performance is sufficiently favorable, a higher operational spindle rotation rate selected. Alternatively, the performance of the head disk assembly may be initially evaluated at a higher spindle rotation rate, and if the performance metric requires, a lower operational spindle rotation rate selected. Evaluation of the performance of the head-disk assembly at an intermediate spindle rotation rate can advantageously be performed and a higher or lower operational spindle rotation rate selected based on the performance of the head-disk assembly.

Figure 2A:
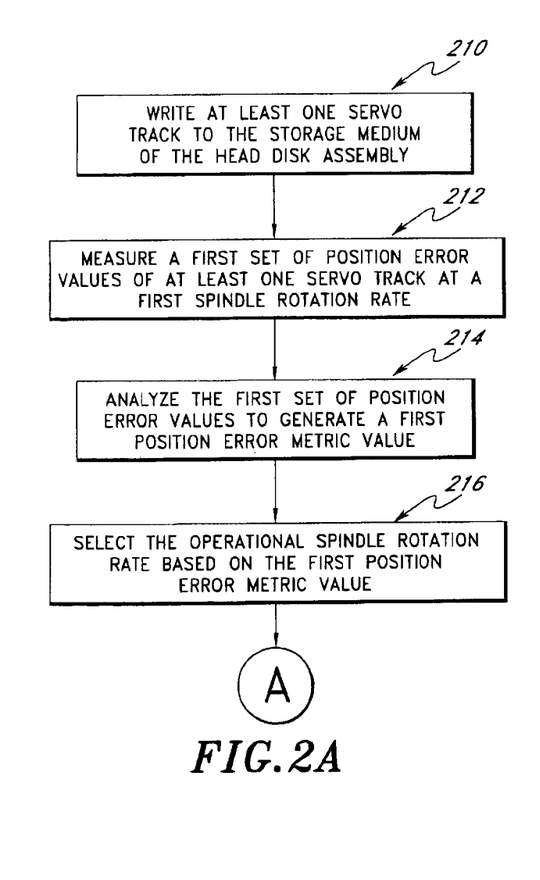
FIG. 2A is a flowchart that illustrates one embodiment of a method of initially selecting an operational spindle rotation rate.

FIG. 2A is flowchart that illustrates one embodiment for selecting the operational spindle rotation rate for a head-disk assembly 12. In a step 210, a plurality of servo tracks are written to the magnetic storage medium 410 on the disks 20. Servo tracks are written to the storage medium 410 to provide position information to of the head 16 and to control the actuator 18. The servo tracks are read at a first spindle rotation rate, and a set of position error values are measured in a step 212. The first spindle rotation rate is advantageously the expected operational rotation rate of the disk drive 10; however, another rotation rate can be chosen for manufacturing or testing reasons. In one embodiment, the flowchart of FIG. 2A continues in FIG. 2B. In an alternative embodiment, the flowchart of FIG. 2A continues in FIGS. 2C and 2D. In a further alternative embodiment, the flowchart of FIG. 2A continues in FIG. 2E.

In a step 214, the first set of position error values are analyzed to generate a position error metric value. The position error metric is a statistical construct generated from the measured set of position error values that has a track follow performance predictive capability. In one embodiment, the position error metric is derived from the position error signal. In an alternative embodiment, the position error metric is derived from only the non-repeatable component of the position error signal. The position error signal is the standard deviation of the measured position error values. The metric can also be the non-repeatable component of the position error variance or other statistical parameters which characterize the position error value behavior. In particular embodiments, the generation of the position error metric value advantageously includes the transformation of the measured set of position error values into the frequency domain. The position error metric can then be generated from the components of the transformed position error values.

In a step 216, the desired operational spindle rotation rate is selected based on the value of the position error metric. In one embodiment, the selection method is a functional relationship wherein the desired operational spindle rotation rates are associated with value ranges for the position error metric. For example, if the position error values are measured at a nominal 7200 RPM rotation rate, a lower bound and an upper bound on the position error metric can trigger the selection of either a 5400 RPM operational rotation rate, in the case of poorer performance, or a 10000 RPM operational rotation, in the case of better performance. Performance within the upper and lower bounds would result in the retention of the nominal 7200 RPM rotation rate as the selected operational rotation rate. However, more complicated functional relationships can be used to determine the desired operational rotation rate.

In particular embodiments of the present invention, the step 216 of selecting the operational spindle rotation rate occurs when servo tracks are written to the head disk assembly 12. In alternative embodiments, the step 216 of selecting the operational spindle rotation rate occurs at a later time. The servo tracks can be written by a servo track writer 400, or the servo tracks can be self-written. Alternatively, a subset of servo tracks can be written as a seed by a servo track writer 400, and the remainder of the servo tracks can be self-written. Self servo writing is a method of having a disk drive write the servo tracks onto its own storage medium 410 and is described in U.S. Pat. No. 5,949,603, issued Sep. 7, 1999.

Figure 2B:
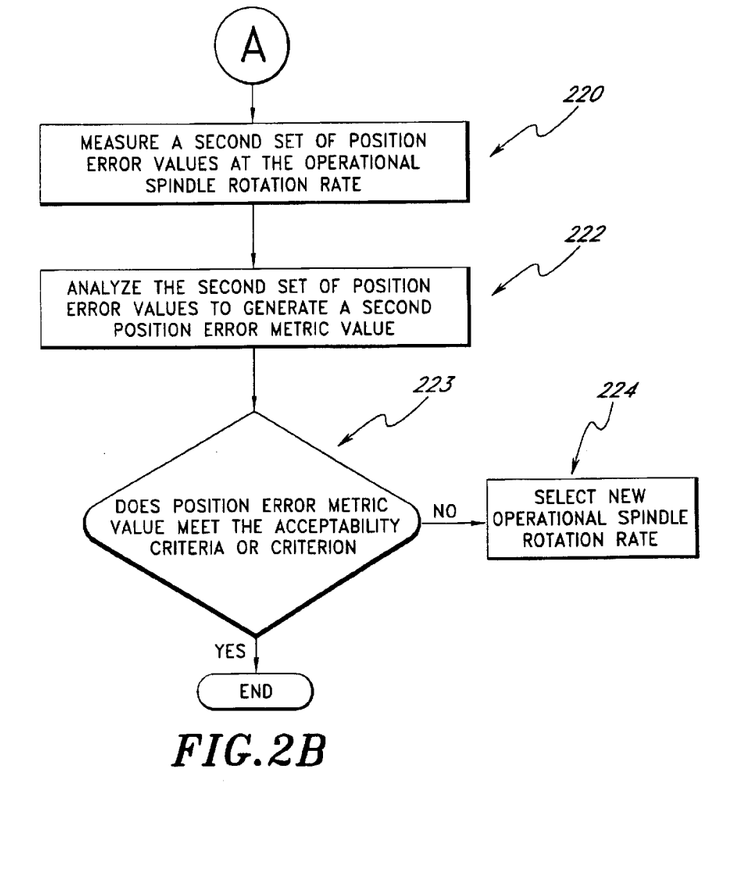
FIG. 2B is a flowchart that illustrates a method of verifying the selected operational spindle rotation rate in accordance with one embodiment.

In particular embodiments of the invention, a verification process is advantageously included after the selection of the desired operational spindle rotation rate, as illustrated in FIG. 2B. In a step 220, a second set of position error values of the servo tracks is measured while operating the head-disk assembly 12 at the operational spindle rotation rate. Advantageously, the servo tracks are the same servo tracks written to the disk for the determination of the desired spindle rotation rate. Alternatively, new servo tracks are written. The second set of position error values is analyzed in a step 222 to produce a second position error metric value. In particular embodiments, the analysis performed to generate the second error metric value is the same analysis performed to produce the first error metric value. In alternative embodiments, the second error metric value is generated via a different form of analysis than that used to generate the first error metric value.

In a step 223, the position error metric value is compared to an acceptability criterion or to a set of acceptability criteria. In particular embodiments, the acceptability criterion is the maximum allowable position error standard deviation. Other acceptability criteria can be selected including combinations of parameters. Examples of acceptability criteria include using a set of statistical criteria for repeatable and non-repeatable components of the position errors.

If the position error metric meets the acceptability criterion or criteria, then the desired selected operational spindle operation rate can be used. If the acceptability criterion or criteria are not met, then a step 224 is performed to select a new operational spindle rotation rate by switching to a lower spindle rotation rate or by repeating the analysis previously performed to ascertain a new spindle rotation rate. In particular cases, the failure to meet the acceptability criteria at the desired operational spindle rotation rate may be the result of resonance at the desired rotation rate. In such cases, a small change to the desired operational rotation rate can be effected to cause the disk drive 10 to operate at a spindle rate close to the desired spindle rotation rate to avoid the negative effects of the resonance.

Figure 2C:
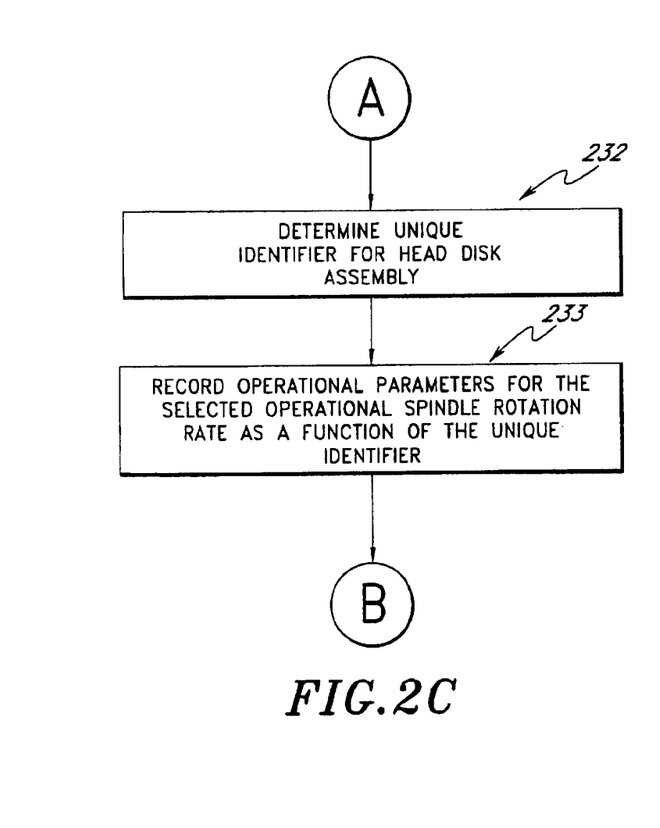
FIG. 2C is a flowchart that illustrates the determination of a head-disk assembly unique identifier and the recording of operational parameters in one aspect of an embodiment.
Figure 2D:
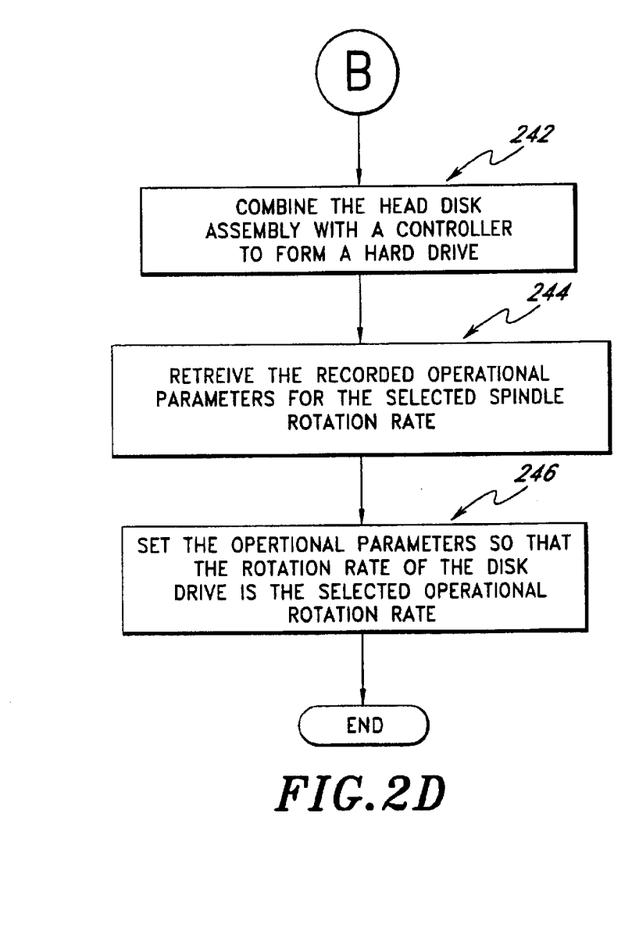
FIG. 2D is a flowchart that illustrates the method of assembling the disk drive, and retrieving and setting the operational control parameters for the disk drive in one embodiment.

FIGS. 2C and 2D illustrate additional portions of a method used in alternative embodiments to enable the operation of the disk drive 10 at the selected operational spindle rotation rate. In a step 232, a unique identifier of the head-disk assembly 12 is determined. The unique identifier is advantageously a unique intrinsic characteristic of the head-disk assembly 12, e.g., physical parameters relating to the disk 20 or actuator 18. Alternatively, the unique identifier is advantageously an identifier 26 assigned to the head-disk assembly 12 during the manufacturing or testing process, such as, for example, a serial number or a bar code written on the head-disk assembly 12 or an identifier code written to a non-volatile storage location contained as a part of the head-disk assembly 12.

In a step 233, the operational parameters needed to allow the disk 20 to operate at the selected spindle rotation are recorded as a function of the unique identifier 26 of the head-disk assembly 12. The parameters are advantageously spindle speed related parameters including, for example, the format of the disk 20, the spindle servo filter coefficients, such as compensator coefficients and gains, and VCM servo filter coefficients. Although the complete set of parameters can be recorded, only a subset of information that would allow the determination of the parameters at a later time is recorded in some embodiments. In particular embodiments, the information is recorded to an external data repository for use in the later manufacture of a disk drive 10 from the head-disk assembly 12. Alternatively, the information is written directly to the magnetic medium 410 or is indicated in another location on the head-disk assembly 12.

The recorded control parameters are utilized when the head-disk assembly 12 is combined with the controller 14 to form a disk drive 10 in a step 242 of an embodiment, as illustrated in FIG. 2D. In a step 244, the recorded operational parameters or the information needed to reconstruct the parameters is retrieved from the storage location. This retrieval is achieved via reference to the unique identifier of the head-disk assembly 12. The operational parameters to allow operation of the disk drive 10 at the selected operational rotation rate are then set on the controller 14 in an additional step 246. The parameters can be set on the controller by writing to a flash memory, by writing to an EEPROM, or by writing to other non-volatile storage in the controller 14.

Figure 2E:
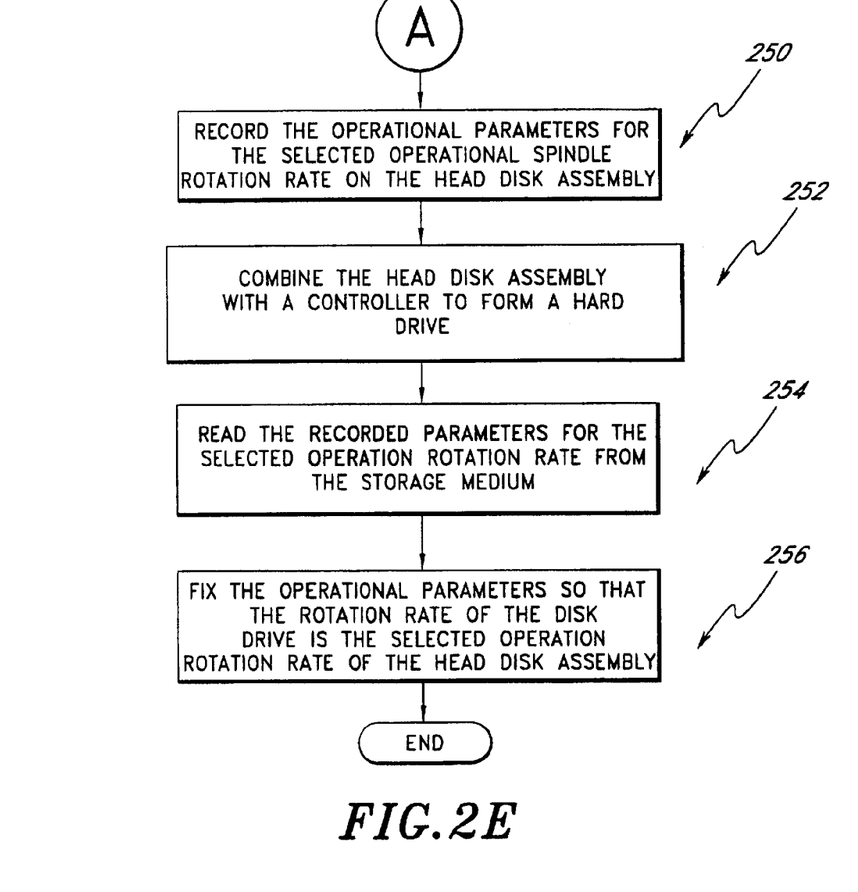
FIG. 2E is a flowchart that illustrates the method of recording the operational control parameters for the head-disk assembly, assembling the disk drive, and retrieving and setting the operational,control parameters in one embodiment.

In further alternative embodiments of the invention, the steps of FIG. 2A are continued in FIG. 2E, wherein the operational parameters are written on the head-disk assembly 12 in a step 250. The parameters are advantageously written directly to the magnetic storage medium 410 of the disks 20. After the head-disk assembly 12 and the controller 14 are combined in a step 252 to create a disk drive 10, the operational parameters are read from the storage medium 410, in a step 254. Then, in a step 256, the parameters are written in a non-volatile memory location, such as a flash memory or an EEPROM, in the controller 14.

In alternative embodiments, the control parameters needed to operate the head-disk assembly 12 at the selected operational rotation rate are indicated in other ways. For example, the head-disk assemblies 12 are separated into populations having the same operational parameters at the time of determination of the selected operational rotation rate. When the head-disk assembly 12 is combined with a controller 14 to form a disk drive 10, the controller is set with the operational control parameter appropriate for the population of head-disk assemblies 12 from which the individual head-disk assembly 12 is selected.

Figure 4:
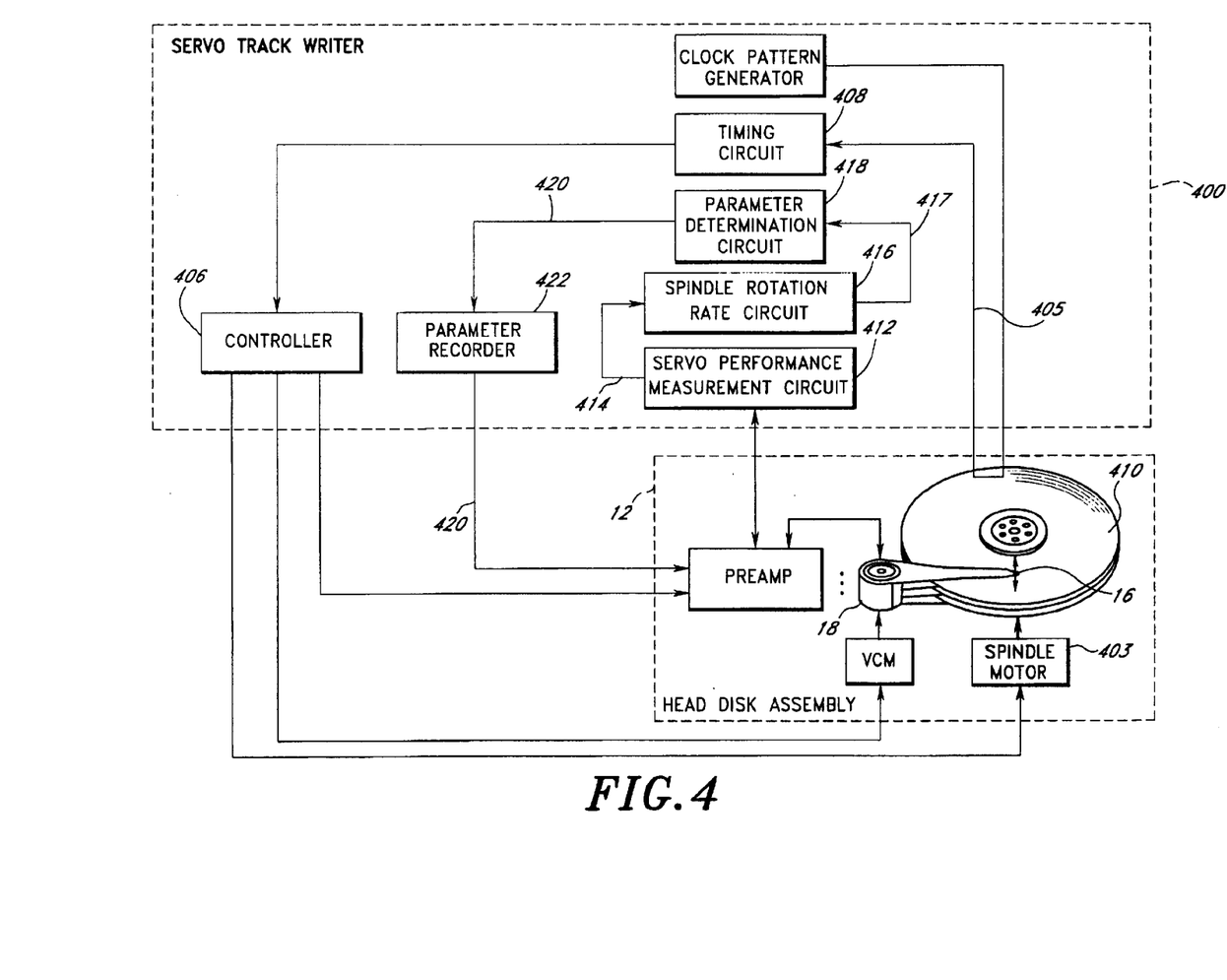
FIG. 4 is a block diagram that illustrates one embodiment of a servo track writer.

In a particular embodiment illustrated in FIG. 4, a servo track writer 400 writes servo tracks on the storage medium 410 of a head-disk assembly 12, measures the servo performance of the head-disk assembly 12, selects a desired operational spindle rotation rate, and determines the operational control parameters 420 used to operate the head-disk assembly 12 at a selected operational rate 417.

The storage medium 410 of the head-disk assembly 12 connects to a spindle motor 403, and the read and write head or heads 16 are attached to an actuator 18. In an embodiment, the servo track writer includes a controller 406 that processes a clock reference pattern 405 via a timing circuit 408 to determine the location of the head 16 relative to the storage medium 410 of the head-disk assembly 12. The controller 406 directs the head 16 to write the servo tracks to the storage medium 410.

A servo performance measurement circuit 412 within the servo track writer 400 measures the position error values of the servo tracks read via the read head 16 from the storage medium 410. The servo performance measurement circuit 412 further generates a position error metric value 414 from the position error values of the servo tracks written to the storage medium 410. The position error metric value 414 is generated by the servo track writer. The position error metric is generated by, for example, dedicated processing units within the servo track writer such as specially designed computer chips, or ASICS, by a specially programmed general purpose computation engine or computer, or by a combination of the two, e.g., a custom interface chip coupled to a general purpose DSP microprocessor.

The servo track writer also includes a spindle rotation rate circuit 416. The spindle rotation rate circuit 416 determines the desired spindle rotation rate 417 based on the position error metric value 414. The spindle rotation rate circuit 416 advantageously includes a simple parameter lookup or interpolation circuit in some instantiations of the servo track writer 400. In other instantiations of the servo track writer 400, the spindle rotation rate circuit comprises a specially designed microprocessor or ASIC that implements a more complex functional relationship between the position error metric value 414 and the spindle rotation rate 417. In other instantiations of the servo track writer 400, the spindle rotation rate circuit advantageously comprises a specially programmed general purpose microprocessor or computer used with, or without, custom microprocessors or components.

The operational control parameters 420 needed to operate the disk drive 10 at the selected spindle rotation rate 417 are selected in a parameter determination circuit 418 of the servo track writer 400. The parameters are advantageously selected from a look up table using the desired spindle rotation rate 417 as an index.

The operational control parameters 420 will include spindle control parameters and, advantageously will include actuator control parameters. The inclusion of actuator control parameters is dependent on whether a new servo format is chosen as a function of spindle rate 417 to maintain a target servo sampling rate. If the servo format is not changed while varying the spindle rate, the actuator control parameters will be included in the control parameters 420.

After selecting the control parameters 420 that allow the disk drive to operate at the selected spindle rotation rate 417, the servo track writer 400 writes the parameters 420 to the head-disk assembly 12. The parameters are advantageously written to a non-volatile storage location on the head-disk assembly 12. In some embodiments, the entire set of control parameters need not be written, but rather an indicia is stored that allows for the recovery of the correct control parameters for use in the hard disk controller when it is assembled with the head-disk assembly 12. The indicia is advantageously recorded physically on the head-disk assembly 12.

In other embodiments, the parameter recorder 422 of the servo track writer 400 records the control parameters 420 to an external data repository for later use when the hard disk controller is assembled with the head-disk assembly 12. In such embodiments, the control parameters 420 are recorded with an indicia to identify the head-disk assembly 12 to which the control parameters 420 pertain. The indicia is advantageously a serial number or a bar code that has been marked directly on the head-disk assembly 12. Alternatively, the indicia is an intrinsic characteristic of the head-disk assembly 12 which can later be re-determined.

In further embodiments, the control parameters 420 are associated with particular head-disk assembly by segregating populations of head-disk assemblies 12 having like control parameters 420 into separate groups; by matching the head-disk assemblies 12, at the time of control parameter 420 determination, with modules that are configured with the appropriate control parameters 420; and by other known manufacturing product management methodologies.

What is claimed is:

1. A method for determining an operational spindle rotation rate for a head-disk assembly comprising a recording head, a rotary actuator, a spindle motor, and a storage medium coupled to the spindle motor, the storage medium comprising an inner circumference, an outer circumference, and a magnetic-storage portion between the inner circumference and the outer circumference, the method comprising:

writing at least one servo track to the storage medium;

measuring a first set of position error values of the at least one servo tracks at a first spindle rotation rate;

analyzing the first set of position error values to generate a first position error metric value; and selecting an operational spindle rotation rate based on the first position error metric value.

2. The method of claim 1, further comprising:

measuring a second set of position error values of the plurality of servo tracks at the operational spindle rotation rate;

analyzing the second set of position error values to generate a second position error metric value;

comparing the second position error metric value to at least one acceptability criterion; and changing the selected operational spindle rotation rate to a second operational spindle rotation rate, if the second position error metric value does not meet the at least one acceptability criterion.

3. The method of claim 1, wherein the method is performed at servo track writing time of the head-disk assembly.

4. The method of claim 3, wherein servo tracks are written by a servo track writer.

5. The method of claim 3, wherein the servo tracks are self-written.

6. The method of claim 3, wherein a plurality of servo tracks are seeded onto the storage medium by a servo track writer and the remainder of servo tracks are self-written.

7. The method of claim 2, wherein the selected operational spindle rotation rate is changed to the second operational spindle rotation rate at a time of integrated burn in of a disk drive incorporating the head-disk assembly.

8. The method of claim 1, further comprising:

determining a unique identifier of the head-disk assembly; and recording operational parameters for the selected spindle rotation rate as a function of the unique identifier of the head-disk assembly.

9. The method of claim 8, further comprising:

combining the head-disk assembly with a controller to form a hard drive;

retrieving the recorded operational parameters for the selected spindle rotation rate based on the unique identifier of the head-disk assembly; and setting the operational parameters so that the rotation rate of the disk drive is the selected operational rotation rate of the head-disk assembly.

10. The method of claim 1, further comprising:

recording operational parameters for the selected rotation rate of the spindle motor on the head-disk assembly;

combining the head-disk assembly with a controller to form a hard drive;

reading the recorded parameters for the selected operational rotation rate from the head-disk assembly; and fixing the operational parameters so that the rotation rate for the disk drive is the selected operational rotation rate of the head-disk assembly.

11. A disk drive comprising:

a rotary actuator;

a recording head mounted on the rotary actuator;

a storage medium comprising;
   an inner circumference;
   an outer circumference; and
   a magnetic-storage portion between the inner circumference and the outer circumference onto which servo tracks are written via the recording head;

a spindle motor that rotates the storage medium;

a recorded operational rotation rate based on position error values measured during testing; and a spindle motor rate controller configured to operate the spindle motor at the recorded operational rotation rate.

12. A servo-track writing system for writing a plurality of servo-tracks on the storage medium of the head-disk assembly, the head-disk assembly comprising a read element, a write element, and an actuator, the servo-track writer comprising:

a controller that processes a clock reference pattern to determine the circumferential location of the write element and that directs the write element to write the servo-tracks to the storage medium;

a servo performance measurement circuit that measures position error values of the head-disk assembly and generates a position error metric value; and a spindle rotation rate circuit that calculates a desired operational spindle rotation rate based on the position error metric value.

13. The servo track writing system of claim 12, further comprising a parameter determination circuit that determines the operational control parameters for the head-disk assembly.

14. The servo track writing system of claim 13, further comprising a parameter recorder that writes the operational control parameters onto the head-disk assembly.

15. The servo track writing system of claim 13, further including means for associating the operational control parameters with the head-disk assembly.

* * * * *